(12) United States Patent
Littau et al.

(10) Patent No.: US 9,915,294 B2
(45) Date of Patent: Mar. 13, 2018

(54) PROTECTIVE DEVICE FOR A UNIVERSAL SHAFT AND PROTECTIVE ARRANGEMENT WITH A UNIVERSAL SHAFT AND SUCH A PROTECTIVE DEVICE

(71) Applicant: GKN Walterscheid GmbH, Lohmar (DE)

(72) Inventors: Matthias Littau, Alfter (DE); Martin Hector, Siegburg (DE); Andreas Hock, Lohmar (DE); Wolfgang Adamek, Lohmar (DE); Stefan Korber, Pulheim (DE)

(73) Assignee: GKN Walterscheid GmbH, Lohmar (DE)

( * ) Notice: Subject to any disclaimer, the term of this patent is extended or adjusted under 35 U.S.C. 154(b) by 0 days.

(21) Appl. No.: 15/428,218

(22) Filed: Feb. 9, 2017

(65) Prior Publication Data

US 2017/0227061 A1 Aug. 10, 2017

(30) Foreign Application Priority Data

Feb. 10, 2016 (EP) ..................................... 16155045

(51) Int. Cl.
*A01B 71/08* (2006.01)
*F16D 3/84* (2006.01)
(Continued)

(52) U.S. Cl.
CPC ............. *F16D 3/841* (2013.01); *A01B 71/08* (2013.01); *F16D 3/84* (2013.01); *F16J 3/045* (2013.01); *F16P 1/02* (2013.01); *F16D 2300/12* (2013.01)

(58) Field of Classification Search
CPC ............ A01B 71/08; F16D 3/84; F16D 3/841
(Continued)

(56) References Cited

U.S. PATENT DOCUMENTS 1,982,445 A 11/1934 Miquelon
5,845,911 A * 12/1998 Gimino .................... F16J 3/045
277/631
(Continued)

FOREIGN PATENT DOCUMENTS

EP 0 918 951 9/2002
GB 20526 11/1915
(Continued)

OTHER PUBLICATIONS

Translation of WO 2008/126791. Akita, et al. Wheel Support Device and Drive Shaft Device Using the Same. Oct. 23, 2008.*

*Primary Examiner* — Josh Skroupa
(74) *Attorney, Agent, or Firm* — Bejin Bieneman PLC

(57) ABSTRACT

A protective device for a universal shaft (3) has an attachment element (6), a tubular guard (7) and at least one latching device (24, 25). The attachment element (6) is positioned around a shaft journal (2) projecting from a housing (1). The tubular protective guard (7) extends along a longitudinal axis L and is positioned around a universal shaft (3) connected to the shaft journal (2). The at least one latching device (24, 25) attaches the protective guard (7) on the attachment element (6). The protective guard (7) has at least one joining lines (9, 10) extending in the longitudinal direction L. The protective guard (7) can be separated and opened to receive the universal shaft (3).

9 Claims, 3 Drawing Sheets

(51) Int. Cl.
*F16J 3/04* (2006.01)
*F16P 1/02* (2006.01)

(58) Field of Classification Search
USPC ........................................ 464/170, 177, 176
See application file for complete search history.

(56) References Cited

U.S. PATENT DOCUMENTS

| | | | | |
|---|---|---|---|---|
| 6,171,010 | B1 * | 1/2001 | Nagashima | F16J 3/045 |
| | | | | 277/634 |
| 6,203,440 | B1 * | 3/2001 | Bondioli | A01B 71/08 |
| | | | | 277/636 |
| 6,764,243 | B1 * | 7/2004 | Inuzuka | F16J 3/045 |
| | | | | 277/634 |
| 7,641,562 | B2 * | 1/2010 | Nakamura | F16D 3/845 |
| | | | | 403/381 |

FOREIGN PATENT DOCUMENTS

| | | |
|---|---|---|
| GB | 308063 | 3/1929 |
| WO | WO 2008/126791 | 10/2008 |

\* cited by examiner

PROTECTIVE DEVICE FOR A UNIVERSAL SHAFT AND PROTECTIVE ARRANGEMENT WITH A UNIVERSAL SHAFT AND SUCH A PROTECTIVE DEVICE

CROSS-REFERENCE TO RELATED APPLICATION

This application claims priority to European Patent Application No. 16155045.4, filed Feb. 10, 2016. The entire disclosure of the above application is incorporated herein by reference.

FIELD

The disclosure relates to a protective device for a universal shaft. The protective device has an attachment element positioned around a shaft journal to projecting from a housing and to be attached to the housing. The protective device has a tubular protective guard that extends along a longitudinal axis. The tubular guard is positioned around a universal shaft connected to the shaft journal. The protective device has a latching device that attaches the protective guard to the attachment element. Furthermore, the disclosure relates to a protective arrangement with a universal shaft and such a protective device.

BACKGROUND

A protective device is known from EP 0 918 951 B1. The protective device, described there, has a disc that can be mounted onto a gearbox housing. A shaft journal projects from the stationary gearbox housing. A universal shaft, with a protective cover, can be connected to the shaft journal. The protective device has a sleeve. The sleeve is tubular and uniform along the circumference. The sleeve is engaged with an inner edge of the disc. It is clamped by clamping clips to the edge of the disk and can also be detached from it. The universal shaft is passed through the sleeve. A disadvantage is that during the assembly of the universal shaft, the sleeve has to be threaded onto the universal shaft. Thus, the universal shaft has to be handled together with the sleeve.

This type of protective device also ensures further protection from universal shaft. The universal shaft, which is drivingly connected to the shaft journal, has a device that is essentially tubular and encloses the universal shaft. The universal shaft device is rotatably attached on the universal shaft and secured against rotation. For this, rotational securing elements, for example in the form of a chain, are provided. This connects the universal shaft device to the stationary component. Thus, the device covers rotating components of the universal shaft as the universal shaft is arranged rotatably within the stationary universal shaft protective device. An axially free unprotected area exists to enable articulation of the universal shaft and to prevent a collision between the universal shaft protection element and housing of the gearbox. To also cover this area, a protective device of the above named type has to be provided. In this case, the protective guard is dimensioned in axial direction so large, that it covers at least the open area between the housing of the gearbox and the universal shaft protection device. Preferably, also a portion of the universal shaft protection device is covered in an axial direction.

SUMMARY

It is an object of the present disclosure to provide a protective guard of the protective device that is simple to mount and to demount.

The object is met by a protective device for a universal shaft wherein the protective device comprises an attachment element, a tubular protective guard and at least one latching device. The attachment element is positioned around a shaft journal projecting from a housing. It is attached to said housing. The tubular protective guard extends along a longitudinal axis. It is positioned around a universal shaft connected to the shaft journal. The at least one latching device attaches the protective guard to the attachment element. The protective guard has at least one joining line, extending in a longitudinal direction, that separates the protective guard to open the protective guard.

The at least one joining line extends along the entire length of the protective guard. Thus, the protective guard is opened so that it can be put over the universal shaft in a radial direction. Thus, it is not necessary to thread the protective guard onto the universal shaft before mounting the universal shaft.

The at least one of the joining line has a closure mechanism to close and lock the protective guard. The at least one joining line can be formed such that it serves as a hinge as well as closure mechanism. This has the advantage, that generally all joining lines can be formed identically or approximately identically.

The closure mechanism includes latching elements. The closure mechanism is in the form of eyelets and/or hooks. The eyelets or hooks form fittingly engage each other in the closed position of the protective guard. The latching elements are arranged along longitudinal edges of the protective guard at the joining line.

The latching elements are aligned with each other in the closed condition of the protection guard along a connection axis and form a connection channel. The connection axis is preferably aligned parallel to the longitudinal axis. Furthermore, a connection pin is provided that passes through the connection channel and rests in the same. The connection pin serves, in this case, to hold the latching elements relative to each other in a form fitting manner. In this case, the latching elements can be formed so that, in the case, several joining lines are provided. The two shell elements connect to each other and can be pivoted around the connection pin. The closure mechanism, hence, serves at the same time as a hinge.

The entire protective guard can be elastically formed. Thus, it can be expanded at the joining line. The protective guard has at least two joining lines. Both extend in a longitudinal direction and separate the protective guard into at least two shell elements. Thus, the protective guard can basically be formed elastically, however, it can also be made from a relatively rigid material.

At least one of the joining lines can, in this case, include a hinge. The at least two shell elements are movable or can be pivoted relative to each other around the hinge. The hinge can be provided with an axis of rotation or can be formed as an integral foil hinge.

The connection pin can have a head portion, increased relative to the connection channel that is arranged at an end of the connection pin. Thus, the connection pin can be pushed into the connection channel. The end pushes into the connection channel, the end faces away from the head portion. The design of the head portion is such that it increases relative to the connection channel. This prevents the connection pin from being pushed too far into the connection channel. Furthermore, the head portion forms an end abutment.

The head portion can be formed as an eyelet. Thus, this enables a securing element to non-detachably connect the attachment element, the protective guard and the connection pin to each other in a condition detached from each other. The securing element can, for example, be a rope, a wire or a chain. The securing element is connected on the attachment element and on the protective guard, for example with its ends. The securing element is passed through the eyelet on the connection pin. Alternatively, the securing element can also be attached in a different manner on the connection pin. Thus, this ensures that even when the protection guard is open and detached from the attachment element, the individual components do not get lost.

The attachment element is formed and arranged so that, in the mounted condition of the protective guard, it covers the connection channel in an axial direction. The connection pin is secured against removal from the connection channel in the direction to the attachment element. When trying to pull the connection pin in a direction towards the attachment element, it collides against the attachment element. Thus, at the same time, it cannot be removed from the connection channel. Thus, this ensures the connection pin is not unintentionally removed, for example due to rattling or vibrations, from the connection channel. To accomplish this, the provided increased head portion of the connection pin projects from the end of the connection channel facing the attachment element. Thus, the connection pin cannot be pulled out or exit, in the other direction, away from the attachment element, from the connection channel.

Thus, generally the protection guard is initially detached from the attachment element and has to be axially pushed parallel to the longitudinal axis. Then, the connection pin can be removed from the connection channel and the protective guard can be opened.

The object is met by a protective arrangement, comprising a universal shaft with a universal shaft protection element, enclosing the universal shaft and a protective device as above described. The universal shaft is drivingly connected to a shaft journal projecting from a housing. The attachment element of the protective device is, in this case, positionable around the shaft journal and attached to the housing. The protective guard of the protective device is arranged so that it partially encloses the universal shaft as well as the universal shaft protection element.

Thus, this ensures that a gap between the universal shaft protection element and the housing is covered by the protective guard.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
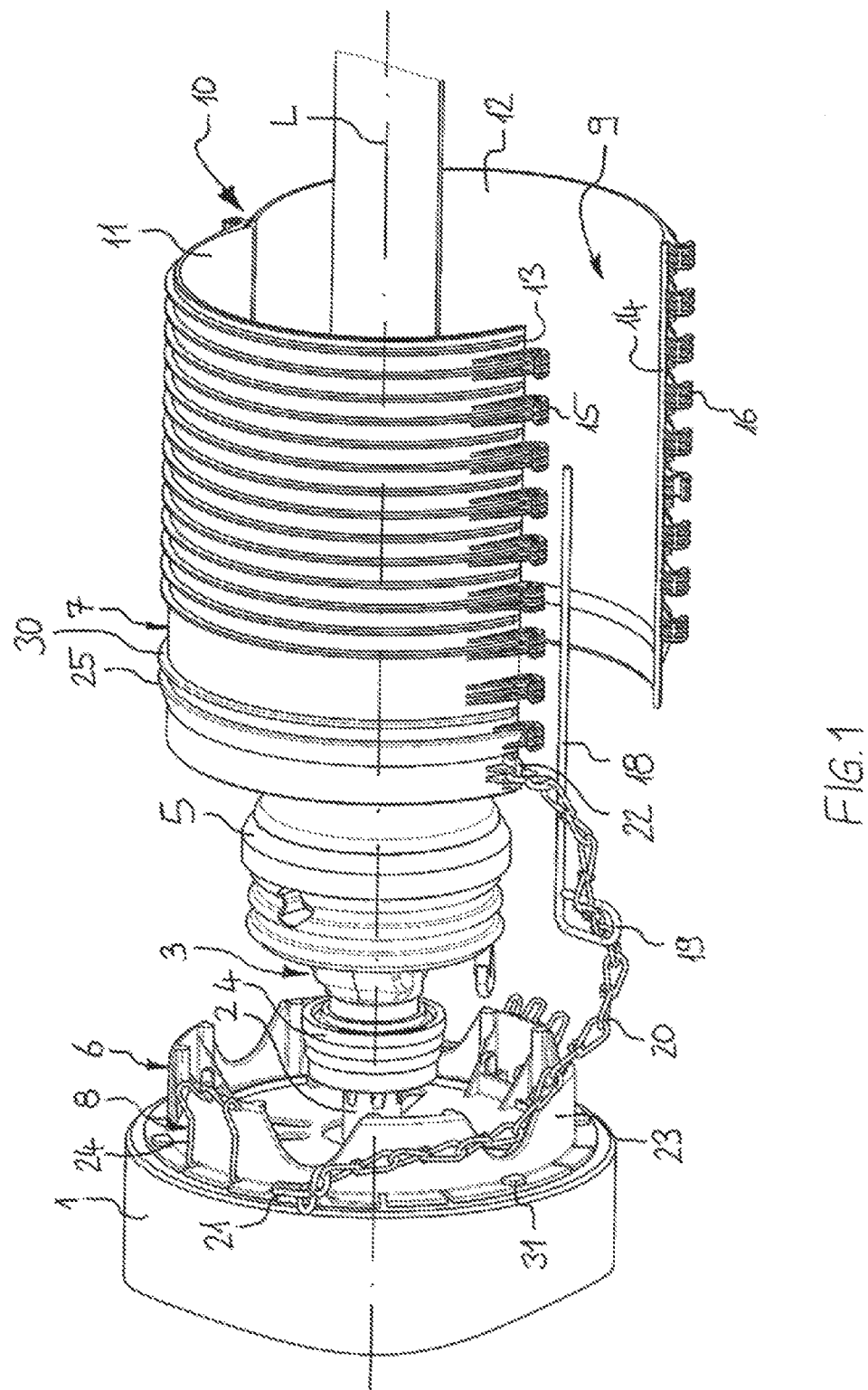
FIG. 1 is a perspective exploded view of a protective device for protecting a universal shaft according to the disclosure.
Figure 2:
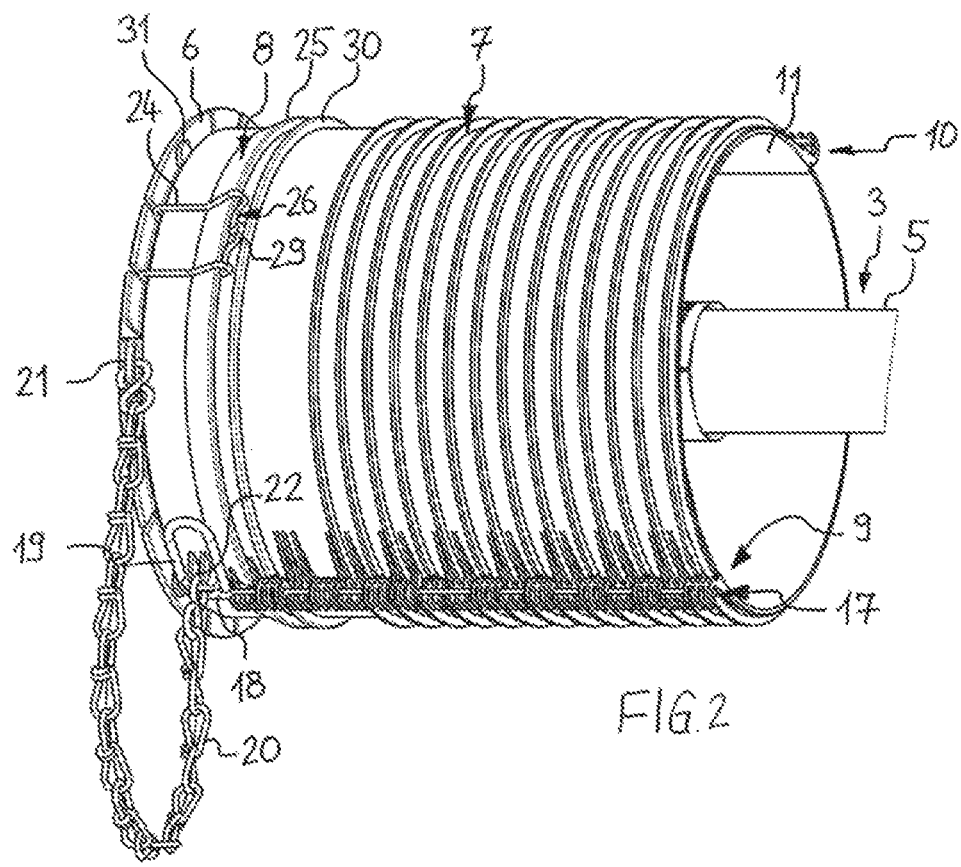
FIG. 2 is a perspective view of the protective device of FIG. 1 with the mounted protective guard.
Figure 3:
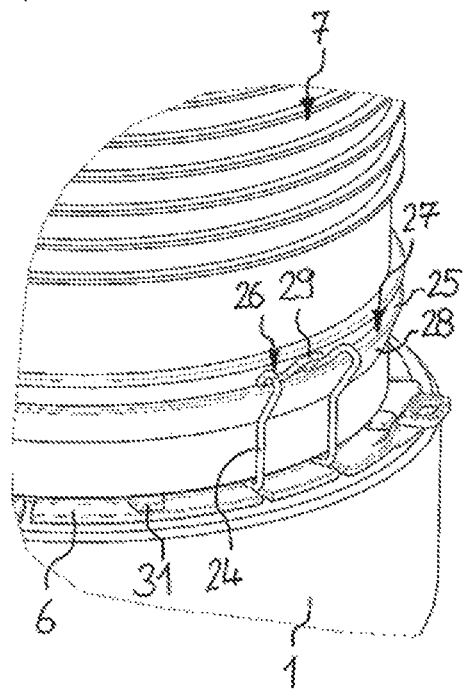
FIG. 3 is an enlarged perspective view of the locking unit of the protective device of FIGS. 1 and 2.

FIGS. 1 and 2 show the protective device in different views and are described in the following together.

The protective device is attached on a housing 1, for example of a gearbox. A shaft journal 2 projects from the housing 1 and is driven or drivable around a longitudinal axis L. In this case, for example, it can be the input shaft of a gearbox of a to be driven agricultural implement.

A universal shaft 3 is drivingly connected to the shaft journal 2. Thus, the universal shaft 3 rotates with the shaft journal 2 around the longitudinal axis L. A fastener 4 is provided to detachably lock the universal shaft to the shaft journal 2. A common shaft toothing (splines) serves for torque transmission.

A universal shaft protection element 5 is provided and is rotatably supported on the universal shaft 3. It accommodates the same and is non-rotationally held relative to a stationary component, for example the housing 1 or a different housing. A chain (not shown) is connected to the stationary component and to the universal shaft protection element 5. Thus, this prevents the universal shaft protection element 5 from rotating together with the universal shaft 3.

As is visible from FIG. 1, an axial portion between the gearbox housing 1 and the end of the universal shaft protection element 5 is not protected. To cover this portion, the protective device is provided according to the disclosure.

The protective device includes an attachment element 6 and a protective guard 7. The attachment element 6 is attached in a fast manner on the housing 1. The protective guard 7 is detachably connected to the attachment element 6 by a latching device 8. The protective guard 7 can be opened (FIG. 1), to arrange it, as described in more detail later, around the universal shaft 3. In the closed condition (FIG. 2), the protective guard 7 is tubular. In this condition, it is locked to the attachment element 6 and coaxially arranged to the longitudinal axis L. In this case, the protective guard 7 covers the portion of the universal shaft 3 between the housing 1 and the end of the universal shaft protection element 5 facing the housing 1.

The protective guard 7 has a first joining line 9 and a second joining line 10. The joining lines 9, 10 extend parallel to the longitudinal axis L. The joining lines 9, 10 separate the protective guard 7 into a first shell element 11 and a second shell element 12. The joining lines 9, 10 are, in the present case, formed identically, so that the two shell elements 11, 12 can be formed identically. Thus, this prevents different tools from needing to be provided for manufacturing the first shell element 11 and the second shell element 12. Thus, this reduces the diversity of the components of the protective device. In the following, the first joining line 9 is described exemplary in more detail.

Figure 5:
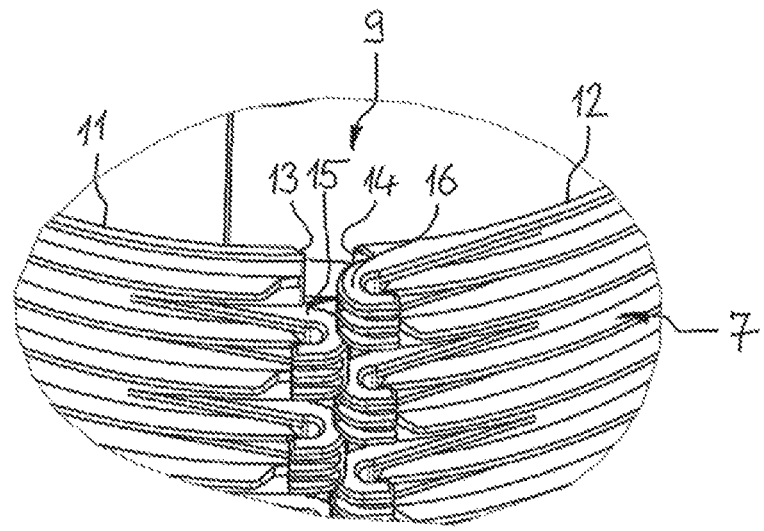
FIG. 5 is an enlarged perspective view of a closure mechanism on one of the joining lines in the open condition.
Figure 6:
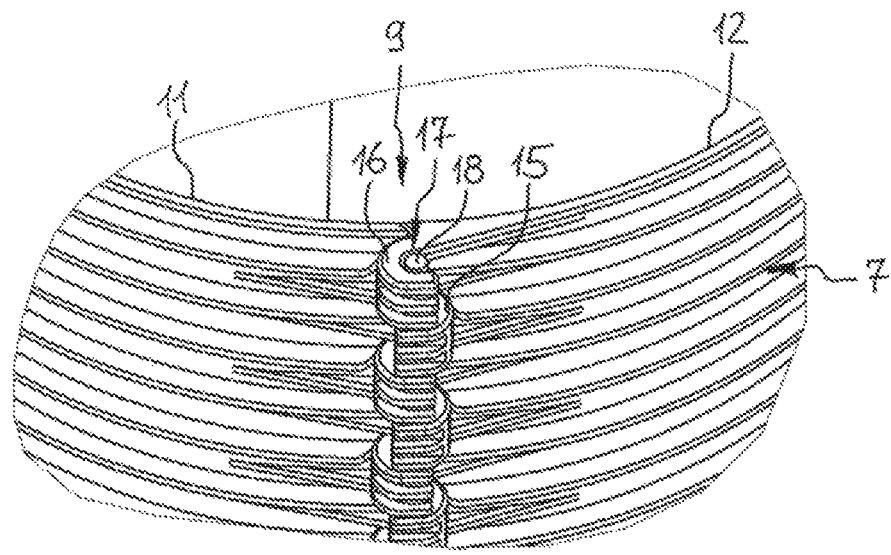
FIG. 6 is an enlarged perspective view of the closure mechanism of FIG. 5 in the closed condition.

The first joining line 9 is formed by a longitudinal edge 13 of the first shell element 11 and a longitudinal edge 14 of the second shell element 12. The two longitudinal edges 13, 14, in the closed condition of the protective guard 7 (FIG. 2), abut each other and are connected with each other. A closure mechanism connects the longitudinal edges 13, 14. The closure mechanism includes form fitting latching elements in the form of hooks 15, provided on the longitudinal edge 13 of the first shell element 11, and hooks 16, along the longitudinal edge 14 of the second shell element 12. The hooks 15, 16 of the two longitudinal edges 13, 14 are, respectively, open away from the respective other longitudinal edge 13, 14. The hooks 15 of the longitudinal edge 13 of the first shell element 11 engage in axial gaps between the hooks 16 along the longitudinal edge 14 of the second shell element 12. The protective guard 7 is in its closed position, as this is visible in FIGS. 5 and 6. In the closed condition (FIGS. 2 and 6), the hooks 15, 16 form a connection channel 17 that extends parallel to the longitudinal axis L.

A connection pin 18 is axially inserted into the connection channel 17. The hooks 15, 16, when trying to move the two shell elements 11, 12 away from each other, are supported on the connection pin 18 in a circumferential direction. Thus, opening of the shell elements 11, 12 is prevented. To prevent the connection pin 18 from being pushed too far in one direction through the connection channel 17, the connection pin 18 has a head portion. The head portion is increased in size, relative to the diameter of the connection channel 17, in form of an eyelet 19. The eyelet 19 is arranged at the end of the connection channel 17 facing the attachment element 6 or at the end of the protective guard 7 facing the attachment element 6. The attachment element 6 is arranged, when seen in an axial direction, overlapping the connection pin 18 or the eyelet 19. The connection pin 18 thus collides against the attachment element 6 when trying to move it out of the connection channel 17. At the same time, the connection pin 18 has not been completely pulled out of the connection channel 17. Thus, in the mounted condition of FIG. 2, the connection pin 18 is prevented from being unintentionally pulled out of the connection channel 17 or moving out of the same due to vibrations.

The second joining line 10 can be identically formed. Thus, an identical connection pin 18 is provided. The second joining line 10 can, however, differ from the first joining line 9 by providing a modified connection pin. The connection pin 18, for example, has no eyelet 19, but has, at both ends, an increased portion. By deforming the ends of the connection pin 18, the protective guard 7 cannot be opened at the second joining line 10. Thus, it only serves as a hinge. Insofar as the two joining lines 9, 10 are identically formed, each can have identical connection pins 18 as it is shown at the first joining line 9. The two joining lines 9, 10 can serve as hinge and both joining lines 9, 10 can serve as a closure mechanism. Thus, the protective guard 7 can be opened.

To mount the protective guard 7 on the shaft 3, the connection pin 18 can be pulled out of the connection channel 17 of the first joining line 9. Thus, the two shell elements 11, 12 can be pivoted around the second joining line 10 and the protective guard 7 is opened. The protective guard 7 can then, as visible in FIG. 1, be positioned in a radial direction to the longitudinal axis L around the universal shaft 3. As soon as the opened protective guard 7 is in this position, the shell elements 11, 12 can be moved towards each other. Accordingly, the first joining line 9 is closed. The connection pin 18 is inserted into the connection channel 17. Thus, the protective guard 7 is locked and cannot be opened anymore.

To offer securing against loss, a securing element is provided in the form of a chain 20. The chain 20 is attached at one end to a securing eyelet 21 of the attachment element 3 and at another end to a securing eyelet 22 of the first shell element 11. The chain 20 is passed through the eyelet 19 of the connection pin 18. Thus, the protective guard 7 as well as the connection pin 18 are held securely against loss relative to the attachment element 6 in the opened condition of the protective guard 7, as shown in FIG. 1. Alternatively, the chain 20 could also be fixed to a chain link on the connection pin 18. Instead of a chain, a rope or a wire could also be used.

As soon as the protective guard 7 is closed, it can be axially pushed in a direction of the longitudinal axis L onto the attachment element 6. The protective guard 7 can be retained by the latching device 8 on the attachment element 6.

The attachment element 6 has a support collar 23 arranged coaxially to the longitudinal axis L. The protective guard 7 is pushed onto the support collar 23. Alternatively, it is also possible, that the support collar 23 is formed such that the protective guard 7 is inserted into the support collar 23. The support collar 23 provides radial support for the protective guard 7.

The latching device 8 includes two latching elements 24. The latching elements 24 are arranged diametrically opposite to one another. Only one is representably described. It is also possible to assign three or more latching elements. The latching device 8 comprises a latching projection 25. In the present embodiment, the latching element 24 is arranged on the attachment element 6. The latching projection 25 is arranged on the protective guard 7. Generally, these elements can, however, also be arranged vice versa. The latching projection 25 can be arranged on the attachment element 6 and the latching element 24 on the protective guard 7.

The latching element 24 is formed as a spring element in the shape of a spring clip. The latching element 24 is elastically formed. It can be displaced from the latched position, shown in FIG. 4, into a release position, bent radially outwards. It is also possible, that the latching element 24 has a separate spring, which elastically moves a rigid element.

The latching element 24 is supported by a latching portion 26 axially on a latching face 27 of the latching projection 25 in the latched position. The latching projection 25 is formed as a circumferentially extending projection along the entire circumference of the protective guard 7. The latching face 27 is arranged vertically to the longitudinal axis L. The latching face 27 faces away from the housing 1. Thus, the protective guard 7 is locked onto the attachment element 6.

To mount the protective guard 7, it can be pushed onto the support collar 23 so that the protective guard 7 locks automatically. The latching projection 25 has a setting face 28. The setting face 28 interacts with the latching element 24 in axial direction during the mounting of the protective guard 7. Thus, the latching element 24 is displaced into its release position radially outwards. The setting face 28 extends in an axial direction with increasing distance from the support collar 23, indicated in FIG. 4 with dashed lines. The latching projection 25 is conically formed in the area of the setting face 28. The setting face 28, which represents the outer face of the cone, expands in direction away from the attachment element 6 or from the housing 1. Thus, the setting face 28 pushes, when the protective guard 7 moves in direction towards the housing 1, the latching element 24 radially outwards. This continues until the latching portion 26 engages behind the latching projection 25 and is axially supported on the latching face 27.

Figure 4:
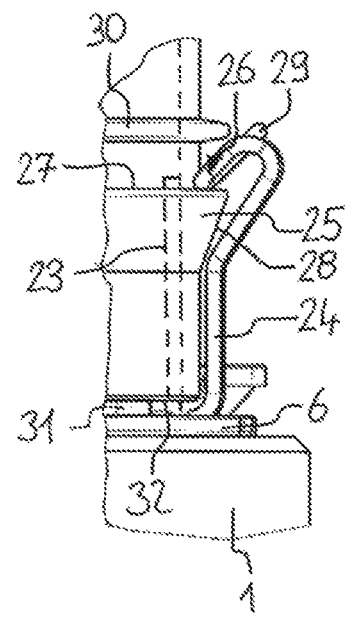
FIG. 4 is a side view of the locking unit of FIG. 3.

The latching portion 26 of the latching element 24 is, in this case, also inclined to the longitudinal axis L (see FIG. 4). A front edge 32 of the protective guard 7 can be supported on the latching element 24 for a better capture of the protective guard 7. If necessary, it can push the latching element 25 slightly radially outwards.

To detach the protective guard 7 from the attachment element 6, the latching elements 24 can be pushed radially outwards. The latching elements 24 have, respective, bulge 29, as engagement means for a tool. For example, a screw driver serves as tool, which is supported in the bulge 29 and on a collar 30 or on the setting face 28 on the protective guard 7. The latching element 24 can be levered away from the protective guard 7 radially outwards. In this case, it is especially advantageous, that the screw driver can be applied approximately parallel to the longitudinal axis L. It does not have to be applied in radial direction. Thus, detaching of the protective guard 7 is also possible under tight conditions.

To enable an easier removal of the protective guard 7 from the attachment element 6, return elements in form of rubber buffers 31 are provided on the attachment element 6. The protective guard 7 is supported in the mounted condition on the rubber buffers 31. The buffer 31 remains elastically biased. As soon as the latching elements 24 are displaced into the their release position, the rubber buffers 31 push the protective guard 7 slightly axially away from the attachment element 6. The latching elements 24 cannot engage again behind the latching face 27. The latching portion 26 comes into external abutment on the setting face 28 on the latching projection 25. A renewed unintentional locking is, thus, prevented.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A protective device for a universal shaft comprising:
an attachment element adapted to be positioned around a shaft journal projecting from a housing and adapted to be attached to the housing;
a tubular protective guard extends along a longitudinal axis, the protective guard adapted to be positioned around the universal shaft connected to the shaft journal;
at least one joining line on the protective guard extending in a longitudinal direction, the at least one joining line separating the protective guard enabling opening of the protective guard;
at least one latching device for attaching the protective guard to the attachment element;
a closure mechanism for closing and locking the protective guard, the closure mechanism extending longitudinal along the at least one joining line;
the closure mechanism comprises latching elements form fittingly engaging each other in a closed position of the protective guard, the latching elements are arranged at longitudinal edges of the protective guard along the at least one joining line, the latching elements are aligned with each other in the closed condition so that the protective guard forms a longitudinal connection channel along the joining line; and
a connection pin extending along the joining line and being accommodated within the longitudinal connection channel.

2. The protective device according to claim 1, wherein the protective guard has at least two joining lines extending in the longitudinal direction separating the protective guard into at least two shell elements.

3. The protective device according to claim 2, wherein at least one of the joining lines comprises a hinge hingedly connecting the at least two shell elements to each other.

4. The protective device according to claim 1, wherein the connection pin has a head portion with an increased size relative to the connection channel.

5. The protective device according to claim 4, wherein the increased head portion is formed as an eyelet.

6. The protective device according to claim 1, wherein the protective device has a securing element inseparably connecting the attachment element, the protective guard and the connection pin to one another when the attachment element, protective guard and connection pin are in a detached open condition.

7. The protective device according to claim 1, wherein the attachment element overlaps, in a mounted condition of the protective guard, the connection channel in an axial direction so that the connection pin is secured against removal from the connection channel in a direction towards the attachment element.

8. A protective arrangement, comprising:
the universal shaft with a universal shaft protection element enclosing the universal shaft, the universal shaft drivingly connected to the shaft journal projecting from the housing, and
the protective device according to claim 1, wherein the attachment element is positionable around the shaft journal and attachable on the housing and the protective guard of the protective device partial encloses the universal shaft as well as the universal shaft protection element.

9. A protective device for a universal shaft comprising:
an attachment element adapted to be positioned around a shaft journal projecting from a housing and adapted to be attached to the housing;
a tubular protective guard extends along a longitudinal axis, the protective guard adapted to be positioned around a universal shaft connected to the shaft journal;
at least one joining line on the protective guard extending in a longitudinal direction, the at least one joining line separating the protective guard enabling opening of the protective guard;
at least one latching device for attaching the protective guard to the attachment element;
a closure mechanism for closing and locking the protective guard, the closure mechanism along the at least one joining line;
the closure mechanism comprises latching elements form fittingly engaging each other in a closed position of the protective guard, the latching elements are arranged at longitudinal edges of the protective guard along the at least one joining line, the latching elements are aligned with each other in the closed condition so that the protective guard forms a connection channel;
a connection pin being accommodated within the connection channel; and
a securing element inseparably connecting the attachment element, the protective guard and the connection pin to one another when the attachment element, protective guard and connection pin are in a detached open condition.

* * * * *